United States Patent [19]

Yaguchi

[11] Patent Number: 4,970,446
[45] Date of Patent: Nov. 13, 1990

[54] MOTOR-POWERED OPENING/CLOSING APPARATUS FOR A WINDOW OR DOOR

[75] Inventor: Osamu Yaguchi, Kashiwazaki, Japan

[73] Assignee: Kabushiki Kaisha Riken, Japan

[21] Appl. No.: 217,638

[22] Filed: Jul. 12, 1988

[30] Foreign Application Priority Data

| Jul. 18, 1987 | [JP] | Japan | 62-179810 |
| Jun. 8, 1988 | [JP] | Japan | 63-140905 |
| Jun. 8, 1988 | [JP] | Japan | 63-140906 |
| Jun. 8, 1988 | [JP] | Japan | 63-140907 |

[51] Int. Cl.$^5$ .............................................. H02P 1/22
[52] U.S. Cl. ...................................... 318/280; 318/282
[58] Field of Search .................. 318/282, 283–286, 318/266, 264

[56] References Cited

U.S. PATENT DOCUMENTS

| 4,335,339 | 6/1982 | Brickner | 318/282 |
| 4,338,552 | 7/1982 | Pilz et al. | 318/266 |
| 4,365,188 | 12/1982 | Walter | 318/282 |
| 4,453,112 | 6/1984 | Sauer et al. | 318/282 X |
| 4,476,416 | 10/1984 | Licata et al. | 318/283 |
| 4,558,259 | 10/1985 | Craig | 318/264 |
| 4,575,662 | 3/1986 | Lehnhoff | 318/282 |
| 4,621,223 | 11/1986 | Murakami et al. | 318/282 |
| 4,675,586 | 6/1987 | Eigner | 318/286 |
| 4,680,513 | 7/1987 | Kennedy | 318/283 |
| 4,683,975 | 8/1987 | Booth et al. | 318/280 |
| 4,701,684 | 10/1987 | Seidel et al. | 318/282 |
| 4,709,196 | 11/1987 | Mizuta | 318/282 |
| 4,710,685 | 12/1987 | Lehnhoff et al. | 318/286 |
| 4,713,591 | 12/1987 | McCloskey | 318/282 X |

Primary Examiner—William M. Shoop, Jr.
Assistant Examiner—A. Jonathan Wysocki

[57] ABSTRACT

A motor-powered opening/closing apparatus includes a circuit for detecting a constrained state of a motor as a power source of a window or a door and deenergizing the motor, and a circuit for detecting clamping of a foreign object between an edge of the window or the door and a fixed frame and stopping or reversing rotation of the motor. These circuits are independently arranged to detect clamping of the foreign object with high sensitivity while a closing force at the closed position can be kept large.

20 Claims, 8 Drawing Sheets

MOTOR-POWERED OPENING/CLOSING APPARATUS FOR A WINDOW OR DOOR

BACKGROUND OF THE INVENTION

1. Field of the Invention

The present invention relates to a motor-powered opening/closing apparatus for a window or door and, more particularly, to a motor-powered opening apparatus suitable as an automobile power window apparatus.

2. Description of the Prior Art

In a conventional automobile power window motor driver, a motor is stopped in response to outputs from sensors such as limit switches for detecting ascending and descending ends of a window glass. Another conventional motor driver uses an overcurrent detection/timer circuit or an overcurrent limiter circuit in place of an end position sensor to cut off or limit a drive current when the motor is stopped or becomes in a constrained state.

In power window motor stop control using a limit switch, a constraining current is continuously supplied to the motor while part of a driver or passenger body is clamped between a glass and a window frame during upward driving of the window glass. Therefore, the driver or passenger may be hurt.

The overcurrent detection/timer circuit or the overcurrent detection limiter circuit primarily aims at detecting an increase in torque on the basis of a constraining current. Therefore, a large torque is generated until or even after a completely constrained state is set. If a soft object such as a child body is clamped between the window glass and the window frame, the limiter circuit may not immediately respond to stop the motor.

Since the conventional detection arrangements are based on current detection, they tend to be adversely affected by variations in power source voltage. Circuit breaking or torque limiting cannot be accurately performed. In particular, when a voltage level is decreased, a constraining current of level lower than a detection level may continuously flow.

In order to solve the above problem, a pressure sensor may be arranged on a glass contact surface of an upper window frame in an automobile. When the window glass reaches the upper end or a foreign object is clamped between the window glass and the window frame, the motor may be stopped in response to an output from the pressure sensor.

However, if sensitivity of the pressure sensor is improved to prevent an accident as described above, slight distortion of the window frame which is caused by deterioration over time may cause incomplete closing of the window glass. In order to prevent this, the sensitivity level of the pressure sensor must be lowered to allow complete closing of the window glass with a sufficient pressure. In this case, the pressure sensor does not respond to clamping of a body portion between the window glass and the window frame.

SUMMARY OF THE INVENTION

The present invention has been made in consideration of the above situation, and has as its object to provide a motor-powered opening/closing apparatus such as a power window apparatus which satisfies both stopping of a power window motor with high-sensitivity detection of clamping of a foreign object between a window glass and a window frame and closing of the window glass with sufficiently large force.

It is another object of the present invention to simplify an arrangement of a circuit for detecting a constrained state of a motor and shutting off power supply.

It is still another object of the present invention to allow arbitrary setting of a motor torque in a constrained state.

It is still another object of the present invention to prevent detection of a motor constrained state from being influenced by a power source voltage It is still another object of the present invention to provide a fail-safe circuit which shuts off power upon motor constrained state under any condition.

It is still another object of the present invention to detect clamping of even a very small foreign object.

It is still another object of the present invention to prevent a sensor failure caused by vibrations of a window or door.

In order to achieve the above objects of the present invention, a motor-powered closing/opening apparatus comprises: a motor serving as a power source for a mechanism for opening/closing a slidable window or a door; a constraint stop circuit for detecting a constrained state of the motor and stopping supply of power to the motor; a sensor for detecting clamping of a foreign object between a fixed frame and an edge of the window or door, the sensor being arranged on the fixed frame close to and along a contact line between the fixed frame and the edge of the window or door and switching means for stopping supply of the power to the motor or inverting a polarity of the power in response to an output from the sensor.

With the above arrangement, the contact force of the window or door in the closed position can sufficiently increased so as to prevent degradation of a closing state against deformation or the like of the fixed frame over time. At the same time, sensitivity of the sensor can be increased to immediately respond to clamping of a foreign object between the window and the fixed frame. Therefore, the closing pressure and the detection sensitivity can be independently set.

BRIEF DESCRIPTION OF THE DRAWINGS

These and other objects, features, and advantages of the invention will become more apparent upon a reading of the following detailed specification and drawing, in which:

FIGS. 7 to 9 show an arrangement of pressure sensors according to the present invention, in which FIG. 7 is a sectional view showing the main part of an automobile window portion, FIG. 8 is a sectional view of one of the pair of pressure sensors, and FIG. 9 is a view showing electrical connections of the pressure sensors; and FIGS. 10 to 14 shows another arrangement of pressure sensors, in which FIG. 10 is a sectional view corresponding to FIG. 7, FIG. 11 is a sectional view showing one of the pair of pressure sensor, FIG. 12 is an exploded view showing a structure of the pressure sensor, FIG. 13 is an equivalent circuit diagram of the pressure sensor, and FIG. 14 is a view showing electrical connections of the pressure sensors.

DETAILED DESCRIPTION OF THE PREFERRED EMBODIMENT

Figure 1:
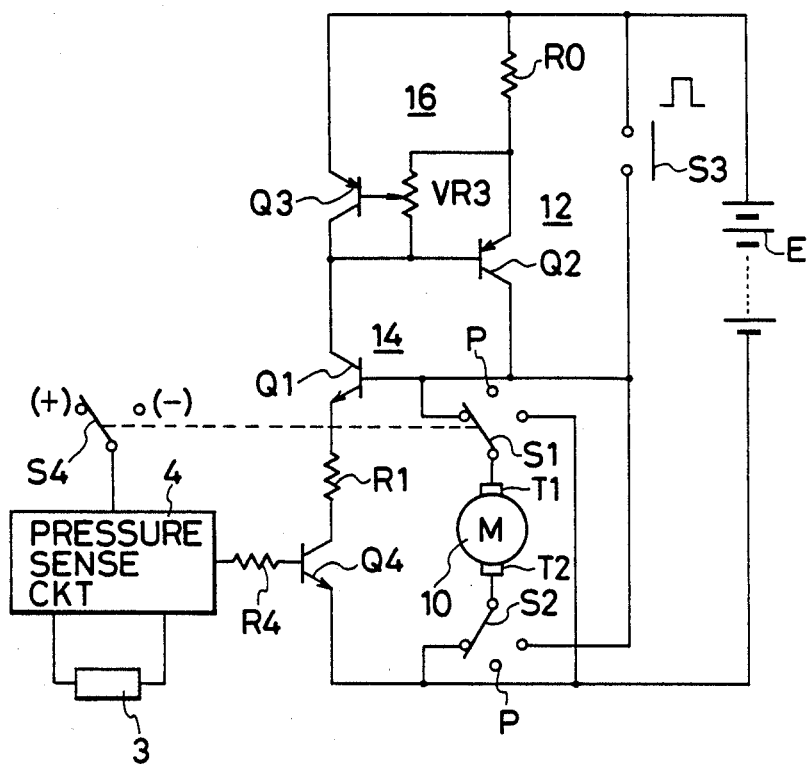
FIG. 1 is a circuit diagram of an automobile power window apparatus which employ a motor-powered opening/closing apparatus according to the present invention.

FIG. 1 shows a control circuit (power window circuit) according to an embodiment of the present invention.

Referring to FIG. 1, a motor 10 is a DC brush motor built into a window lift mechanism. Switches S1 and S2 connected to both terminals of the motor 10 are interlocked with each other upon operation of an ascending-/descending operation switch for a window glass. During ascending and descending, both the terminals of the motor 10 are connected to a drive power source E such that the polarities at the terminals are inverted by the switches S1 and S2. Stop positions P respectively provided to the switches S1 to S2 are neutral positions to stop power supply.

A transistor Q2 connected to the terminal of the motor 10 through the switch S1 constitutes a switch circuit 12 for the drive voltage. The base of the drive transistor Q2 is connected to the collector of a motor terminal voltage detection transistor Q1 which serves as a motor rotation detection sensor. When the transistor Q1 detects a terminal voltage (induction electromotive force) of the motor 10 and is kept on, a current is supplied from the base of the transistor Q2 to the collector of the transistor Q1. Therefore, the drive transistor Q2 is turned on, and the drive voltage is applied from the collector of the transistor Q2 to the motor 10.

The base-emitter path of the rotation detection transistor Q2 is connected through an emitter resistor R1 and a transistor Q4 so as to detect a terminal voltage of the motor 1, i.e., a magnitude of the induced electromotive force. This connection constitutes a motor terminal voltage detector 14. When the motor 10 is rotated and an induced voltage having a level higher than a predetermined level is generated, the base-emitter path of the transistor Q1 is rendered conductive, and the transistor Q1 is turned on. Therefore, the transistor Q2 is kept on. The transistor Q4 is normally ON as is described later.

A switch S3 is inserted in series between the power source E and the switch S1 is connected in parallel with the drive transistor Q2. The switch S3 is interlocked with the switches S1 and S2. When the switches S1 and S2 are operated, the switch S3 is closed to temporarily supply a current to start the motor 10. After start of the motor 10, the transistor Q2 is kept on, as described above, thereby maintaining rotation of the motor 10.

A current detection resistor R0 is connected in series with the emitter of the drive transistor Q2. Both terminals of the current detection resistor R0 are connected to the base and emitter of the current limiting transistor Q3 through a variable resistor VR3, thereby constituting a current limiter circuit 16. When a motor current reaches a preset upper limit, the transistor Q3 is rendered conductive by a voltage drop across the resistor R0 and the base potential of the drive transistor Q2 is pulled up to the power source voltage while the collector potential of the transistor Q2 is decreased. Therefore, an increase in current is prevented. In this case, the limiting current value can be changed by adjusting the resistance of the variable resistor VR3.

Figure 2A:
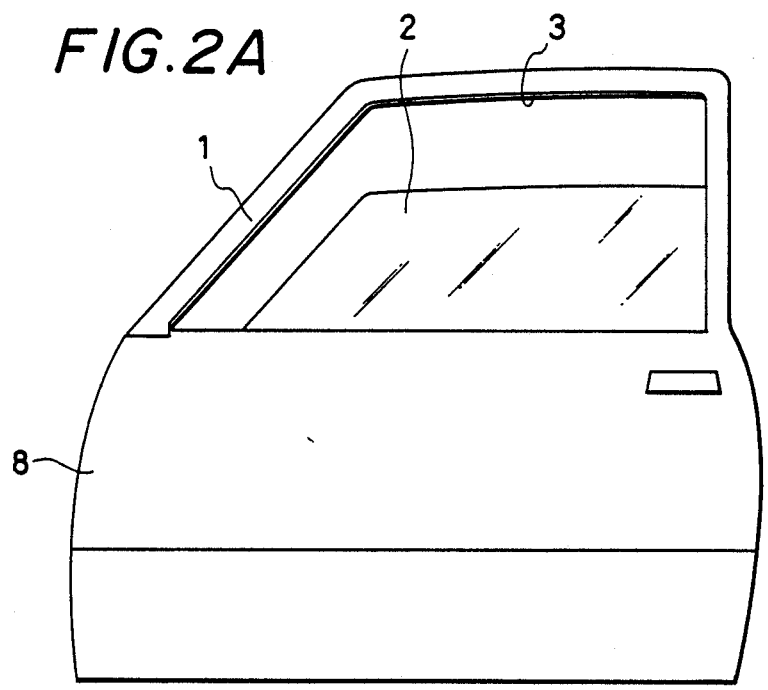
FIG. 2A is side view of an automobile door.
Figure 2B:
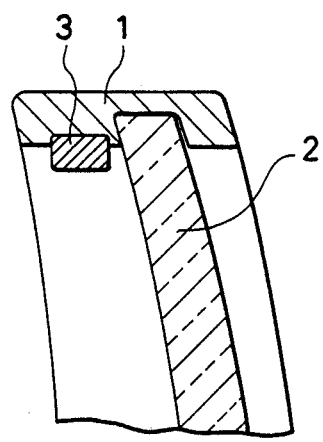
FIG. 2B is a sectional view showing the main part of the door shown in FIG. 2A.

FIG. 2A is a side view showing the main part of an automobile door, and FIG. 2B is a sectional view of an upper window frame portion. A window glass 2 is moved upward/downward by a motor 10 in FIG. 1. A linear pressure sensor 3 of, e.g., pressure-sensitive conductive rubber is arranged along the lower edge of the upper window frame 1 of the door. The pressure sensor 3 is arranged at a portion slightly inside a portion of the window frame 1 which is brought into contact with the window glass 2. The pressure sensor 3 detects clamping of a foreign object between the window glass 2 and the window frame 1 during ascending of the window glass 2. A pressure sensor having a wide sensitivity range is commercially available as the pressure sensor 3. Since the upper end of the window glass 2 need not be detected by the pressure sensor, the pressure sensor 3 may be the one which can be operated at a very small contact pressure.

As shown in FIG. 1, the electrodes of the pressure sensor 3 are connected to a pressure sense circuit 4, and a contact pressure generated by clamping of a foreign object is converted into an electrical signal. The pressure sense circuit 4 receives a positive or negative (ground) signal from a switch S4 interlocked with the switches S1 and S2. The positive or negative signal serves as an ascending/descending signal. During ascending of the window glass, an output signal of high level is supplied to the base of the transistor Q4 through a resistor R4 to turn on the transistor Q4. Therefore, the rotation detection transistor Q1 is kept on. When a foreign object is clamped between the windqw glass 2 and the window frame 1 to operate the pressure sensor 3, the pressure sense circuit 4 detects an output of low level to turn off the transistor Q4. The detection transistor Q1 is turned off and then the drive transistor Q2 is turned off. Therefore, the motor 10 is powered off, and ascending of the window glass 2 is interrupted.

When the switches S1 and S2 are operated and inverted in the stop state, the pressure sense circuit 4 outputs a signal of high level even if the pressure sensor 3 detects the foreign object. In this case, the transistor Q4 is turned on. When the switch S3 is closed in synchronism with inversion of the switches S1 and S2, the detection transistors Q1 and the drive transistor Q2 are turned on. Therefore, the motor 10 is rotated in the reverse direction and the window glass 2 is descended.

When the pressure sensor 3 is not operated, i.e., in a normal state, the detection transistor Q1 detects the constraint state of the motor 10 to turn off the drive transistor Q2 on the basis of the following principle at the ascending and descending ends of the window glass.

Figure 3:
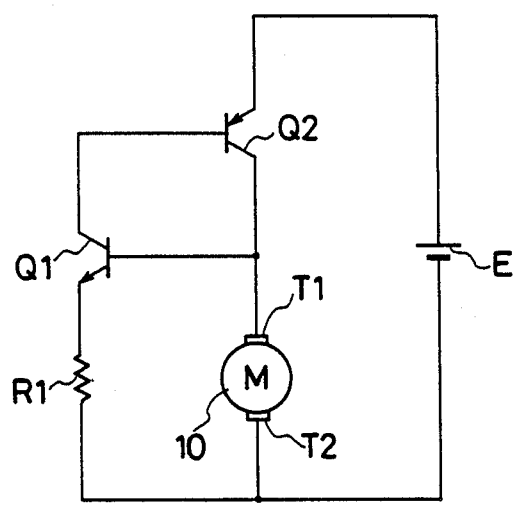
FIG. 3 is a circuit diagram showing the main part of a motor control circuit in the apparatus shown in FIG. 1.
Figure 5:
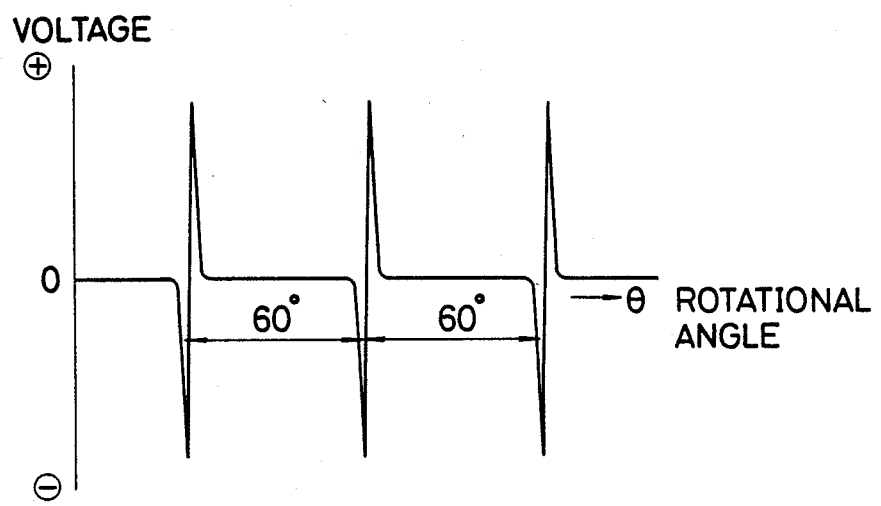
FIG. 5 is a waveform chart of a terminal voltage of the motor.
Figure 4A:
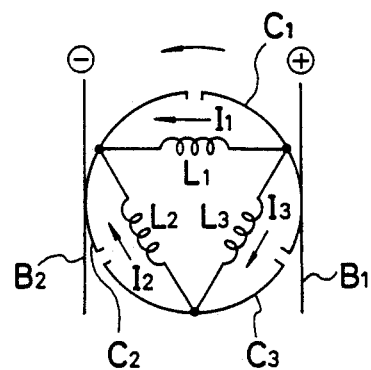
FIGS. 4A to 4C are circuit diagrams of an armature of a motor.
Figure 4B:
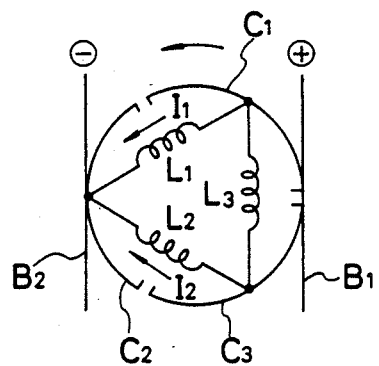
Figure 4C:
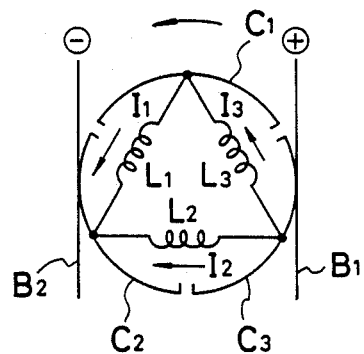

FIG. 3 shows a motor control circuit as the main part of the apparatus shown in FIG. 1. FIGS. 4A to 4C show the operating positions of an armature circuit in the motor 10. In this case, the armature circuit comprises commutators C1, C2, and C3 of three phase delta windings L1, L2, and L3 and a pair of brushes B1 and B2. In the rotational position shown in FIG. 4A, a series circuit of the windings L2 and L3 is in parallel with the winding L1 between the brushes B1 and B2. In the rotational position shown in FIG. 4B, the winding L3 is short-circuited and the windings L1 and L2 are in parallel with each other. In the rotational position shown in FIG. 4C, a series circuit of the windings L1 and L3 is in parallel with the winding L2. Therefore, the direction of current is abruptly changed before and after the rotational position shown in FIG. 4C. Abrupt positive and negative pulse voltages (commutation noise) generated by electromagnetic induction between terminals T1 and T2 of the motor 10 are generated as shown in FIG. 5. The connecting state shown in FIG. 4B occurs six times per revolution of the armature. Therefore, the above pulse voltages are generated every 60°.

When the control circuit is turned on and the motor 10 is rotated in FIG. 3, the base-emitter path of the detection transistor Q1 is reverse-biased by the negative pulse generated between the terminals T1 and T2. The transistor Q1 is temporarily turned off every 60° rotation of the motor 10. As long as the motor 10 is rotated, the control circuit is kept on by the induced positive voltage.

When the motor 10 is set in the constrained state at the ascending or descending end of the window glass 10, a constraining current generally tends to flow. However, the transistor Q1 is turned off in response to the negative pulse generated by the connecting state shown in FIG. 4B prior to the constrained state. In this case, when the rotational speed of the motor 10 is reduced to a level close to the stop, an induced electromotive force En between the terminals T1 and T2 becomes very small, thus establishing condition En < VBE1 (the base-emitter voltage of the transistor Q1). The detection transistor Q1 can be no longer turned on. Therefore, the control circuit is turned off.

In the control circuit shown in FIG. 1, the resistor R1 inserted in the emitter of the transistor Q1 serves as a negative feedback element for the collector current of the transistor Q1. More specifically, when the base current of the transistor Q1 is increased to increase its collector current, the emitter voltage is increased. In this case, the base current is decreased. Therefore, the transistor Q1 can be operated in its active region. Excess minor carriers in the base region can be eliminated, so that a turn-off delay time can be minimized. For this reason, the transistor Q1 can be instantaneously turned off in response to a pulse generated by the armature winding at the polarity switching timing of the commutators upon rotation of the motor 10. Therefore, detection of the constrained state can be properly detected.

The collector current of the transistor Q1 serves as the base current of the transistor Q2. The resistance of the resistor R1 therefore can be determined such that the transistor Q2 is operated substantially in the saturation region when the transistor Q1 is turned on. When the motor 10 is set in the constrained state while the transistor Q2 is kept on and the motor 10 is rotated, the transistor Q2 is set in the turn-off region through the active region and is turned off. In other words, when the motor 10 is rotated, a voltage substantially equal to the power source voltage E appears at the terminal T1. When the transistor Q1 is substantially turned on, a sufficient base current is supplied to the transistor Q2. The transistor Q2 is ON in a state wherein the base current is overdriven. When the motor 10 is decelerated and is set in the constrained state, the potential at the terminal T1 is abruptly decreased and the collector current (base current of the transistor Q2) of the transistor Q1 is reduced. For this reason, the transistor Q2 is temporarily operated in the active region where a current obtained by multiplying the base current with a DC amplification factor is substantially set to be the collector current. The transistor Q1 is instantaneously turned off in response to the pulse noise of the motor 10. Therefore, the transistor Q2 is immediately turned off.

According to the control circuit shown in FIG. 3, when the motor 10 is set in the constrained state, it can be accurately turned off without any failure.

The pressure sensitivity of the pressure sensor 3 for detecting clamping of a body portion between the glass window and the window frame is set regardless of an opening/closing torque of the motor 10 at the ascending and descending ends of the window glass 2. Therefore, the constraint stop condition of the motor 10, i.e., the constraining torque immediately prior to power-off time can be set to be a sufficiently larger value in consideration of the deformation of the window frame 1 over time. The constraining torque can be set by a limiting current value by the current limiter circuit 6. The motor 10 is set in the constrained state at the ascending or descending end of the window glass 2, but the constraining current does not exceed the limit value preset by the variable resistor VR3. Therefore, the motor torque just prior to the constraint of the motor is a predetermined value determined by the limiting current value. The induction voltage between the terminals of the motor is decreased just prior to the constrained state of the motor 10. This state is detected by the detection transistor Q1, and the power-off state is set.

When the pressure sensor 3 is operated, the motor 10 may be rotated in the reverse direction to immediately descend the window glass. A touch sensor (e.g., a sensor for detecting an induction voltage of a human body) or a light-beam type sensor may be used in place of the pressure sensor. The sensor may be arranged such that a plurality of pairs of light-emitting and light-receiving elements are arranged along the upper or inclined side of the window frame 1 to detect clamping of a foreign object according to a light-shielding state.

As above, a sensor for detecting clamping of a foreign object between the upper edge of the window or door and the fixed frame is linearly arranged near a contact line between the edge of the window or door and the fixed frame. The closing pressure of the window or door is set to be sufficiently high in consideration of deformation or the like of the fixed frame, while the sensor sensitivity is set to be sufficiently high to protect the human body from being clamped between the glass window and the fixed frame. More specifically, the closed position need not be detected by the sensor, and the sensing level can be set regardless of the closing pressure. Therefore, an accident such as clamping of a body portion can be properly prevented.

Figure 6:
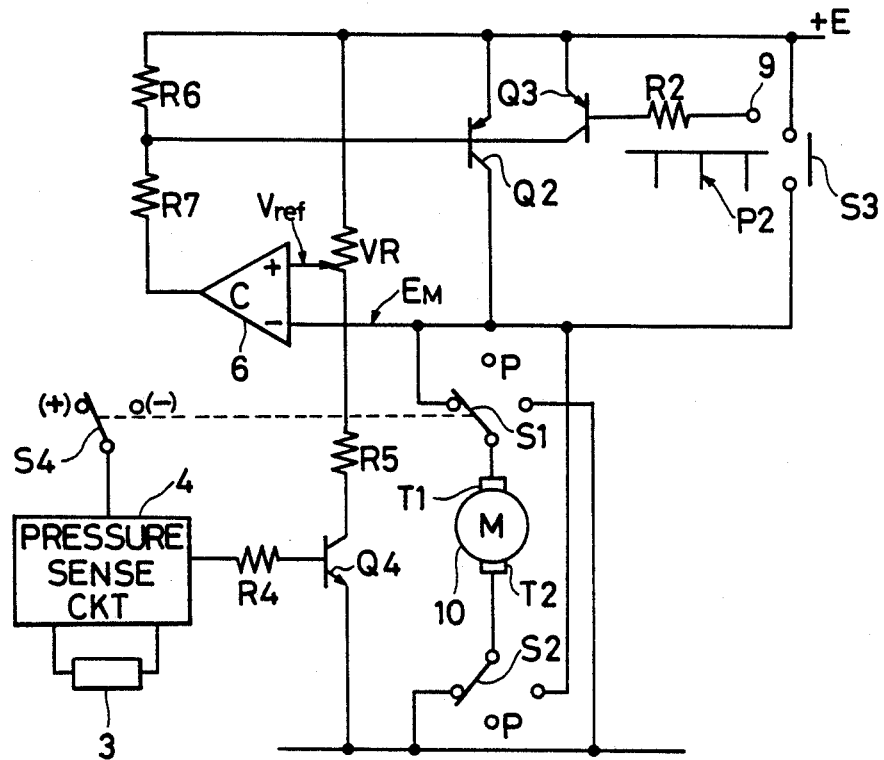
FIG. 6 is a circuit diagram of an automobile power window apparatus according to a second embodiment of the present invention.

FIG. 6 shows an automobile power window circuit according to a second embodiment of the present invention. The same reference numerals as in FIG. 1 denote the same parts in FIG. 6.

Referring to FIG. 6, a transistor Q2 connected to a terminal T1 of a motor 10 through a switch S1 serves as a switching transistor for switching a drive voltage. The base of the drive transistor Q2 is connected to the collector of a shut off transistor Q3 and to an output of a comparator 6 through a voltage divider comprised of resistors R6 and R7. The comparator 6 compares an electromotive force $E_M$ induced at the terminal T1 of the motor 10 with a reference voltage Vref generated by a voltage divider comprised of a variable resistor VR, a resistor R5, and a transistor Q4. The transistor Q4 is normally kept on.

A switch S3 parallel to the drive transistor Q2 between a power source E and the switch S1 is synchronized with the switches S1 and S2. When the switches S1 and S2 are operated, the switch S3 is closed to start the motor 10 so that a current temporarily flows in the motor 10. At the start of the motor 10, a terminal voltage is the power source voltage E, an output from the comparator 6 goes to low level. A base voltage of the drive transistor Q2 is decreased to turn on the transistor Q2, thereby rotating the motor 10. If the transistor Q2 is ON, an output from the comparator 6 is kept at low level. Therefore, the transistor Q1 is kept on.

An instantaneously negative, periodic shut off pulse P2 from a terminal 9 is supplied to the base of the transistor Q3 through a resistor R2. The transistor Q3 is periodically turned on, and then the transistor Q2 is turned off to shut off the motor 10. In this case, however, if the motor 10 is kept rotating, a detection result (low level output) of the induced electromotive force $E_M$ from the comparator 6 is fed back, and the transistor Q2 is kept on.

When the transistor Q3 is turned off and the induced electromotive force $E_M$ becomes almost zero in a constrained state or near constrained state of the motor 10 at the ascending or descending end of the window glass 2, condition $E_M <$ Vref can be established so that an output from the comparator 6 is inverted to high level. Thereafter, power interruption continues since the transistor Q2 will not be turned on.

At a boundary wherein the motor 5 continues rotating or is about to shut off, condition $E_M =$ Vref is established. At this time, a quasi-constraint current $I_B$ of the motor at a speed corresponding to the induced electromotive force $E_M$ is indirectly detected by the comparator 6. In this case, a motor current is given by Vref/$R_M$ (where $R_M$ is an internal resistance of the motor), and a motor torque depends on the quasi-constraint current $I_B$. When the reference voltage Vref is controlled by the variable resistor VR, a torque generated during the motor constrained state can be controlled.

As shown in FIG. 6, electrodes of a pressure sensor 3 is connected to a pressure sense circuit 4, and a contact pressure by clamping of a foreign object is converted into an electrical signal. The pressure sense circuit 4 receives positive and negative (ground) signals from a switch S4 synchronized with the switches S1 and S2. These signals serve as ascending and descending direction signals, respectively. During ascending, an output signal of high level is supplied to the base of the transistor Q4 through a resistor R4. The transistor Q4 is turned on to keep the output of the comparator 6 to be low level. When a foreign object is clamped between the window glass 2 and the frame and the pressure sensor 3 is actuated, the pressure sense circuit 4 outputs a detection output of low level, so that the transistor Q4 is turned off. An output from the comparator 6 goes to high level, and the drive transistor Q2 is turned off. Therefore, the motor 10 is shut off and ascending of the window glass 2 is interrupted.

When the switches S1 and S2 are inverted at the stop state, the pressure sense circuit 4 outputs a signal of high level even if the pressure sensor 3 detects clamping of a foreign object. In this case, the transistor Q4 is turned on. Therefore, when the switch S3 is temporarily closed in synchronism with inversion of the switches S1 and S2, the drive transistor Q2 is turned on. Therefore, the motor 10 is rotated in the reverse direction and the window glass 2 is moved downward.

Since series-connected resistors are not used to detect a constraint current, there is no fear of generating heat or firing. When a battery or the like is used as the power source E, a maximum motor drive current may often not come to a current for generating a preset motor torque set by the variable resistor VR when the battery level is decreased below an allowable level. In this case, even if the motor 10 is constrained and stopped, the electromotive force $E_M$ is not generated, so that power interruption can be properly performed. That is, the motor 10 is prevented from being constrained or stopped while a constraint torque lower than a preset value is kept generated. Unlike in the conventional constraint current detection system wherein the constraint current is detected in accordance with an increase in current value of the motor, the constraint torque is indirectly detected on the basis of a change in induced electromotive force (motor speed) of the motor. Therefore, the above-mentioned constrained state detection and power shut off is reliable and safety.

An arrangement of the pressure sensor assembly will be described with reference to FIGS. 7 to 9.

Figure 7:
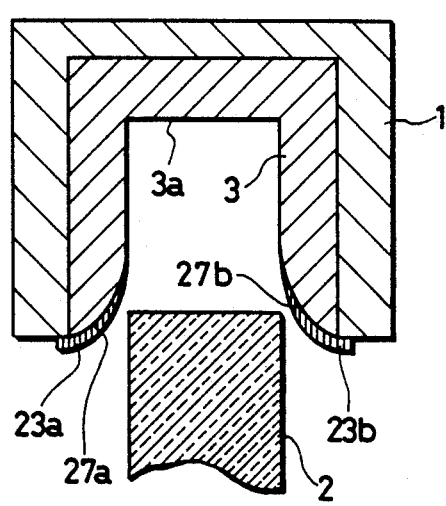
Figure 8:
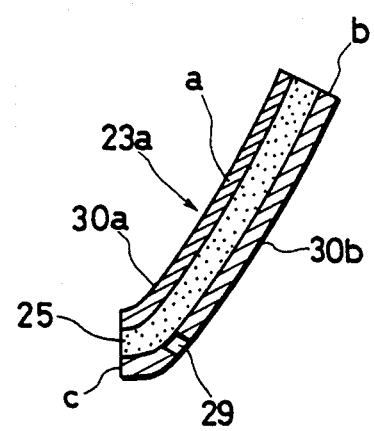

As shown in a sectional view of a main part of an automobile window portion in FIG. 7, a pair of pressure sensors 23a and 23b inside and outside the automobile are mounted on glass guide tapered surfaces 27a and 27b of a window frame packing 3 fitted in a recess of a window frame 1 of a door 8. As shown in FIG. 2A, the pressure sensors 23a and 23b extend along the entire edges of the window frame 1 with which the end face of the window glass 2 is brought into contact. The pressure sensors 23a and 23b detect clamping of a foreign object between the edge of the window glass 2 and the window frame 2.

The window glass 2 can be ascended or descended by a power opening/closing mechanism disposed inside the door 8. Due to deformation of the door 8, the window glass 2 is ascended and reaches a contact surface 3a of the packing 3 while the window glass 2 is regulated by the glass guide tapered surfaces 27a and 27b of the packing 3.

The pressure sensors 23a and 23b are symmetrical about the window glass 2. One pressure sensor 23a has a structure (FIG. 8) wherein conductive rubber 25 whose conductivity is changed by a pressure is sandwiched between a common rear surface electrode a and two front surface electrodes b and c electrically insulated through a gap 29. Insulating coatings 30a and 30b are formed on the outer surface of the electrode a and the outer surfaces of the electrodes b and c, respectively. The front surface electrode b is located on the glass guide tapered surface 27a near the window glass 2, thereby constituting an inner portion of the pressure sensor. The front surface electrode c is located on the surface 27a away from the window glass 2, thereby constituting an outer portion of the pressure sensor. The pressure sensor 23a is bent near the gap 29 such that the surface of the front surface electrode c is directed in the vertical direction.

Figure 9:
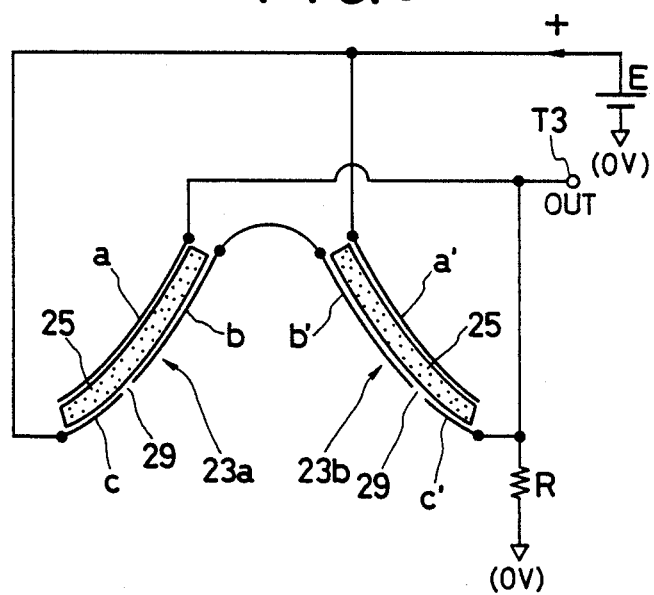
Figure 10:
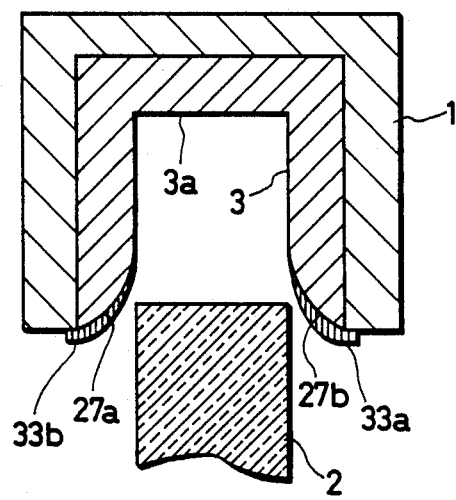

FIG. 9 shows a sensor circuit constituted by connecting electrodes of the sensors 23a and 23b. A rear surface electrode corresponding to the sensor 23b, and front surface electrodes thereof are given as a', b', and c', respectively. In principle, the sensor assembly constitutes switches a–b, a–c, a'–b', and a'–c' serving as pressure sensing switches.

The front surface electrodes c and c' are used to detect a relatively large foreign object. The switches a–c and a'–c' are connected in parallel with each other. When one of the switches a–c and a'–c' is turned on at a given pressure, a detection output appears at an output terminal T3. In the sensor 23a, a current flows through the conductive rubber 25 and the rear surface electrode a from the front surface electrode c connected to the power source E to the resistor R connected to the output terminal T3. Similarly, in the sensor 23b, a current flows through the conductive rubber 25 and the front surface electrode c' from the rear surface electrode a' connected to the power source E to the common resistor R.

The front surface electrodes b and b' are used to detect a relatively small foreign object. The switches a–b and a'–b' are connected in series with each other, i.e., constitutes an AND circuit. When these switches are simultaneously turned on, a detection output is obtained. More specifically, a current from the rear surface electrode a' connected to the power source E flows in an order of the conductive rubber 25, the front surface electrode b', the surface electrode b, the conductive rubber 25, the rear surface electrode a, and the resistor R. The current then appears at the output terminal T3 as a detection signal.

Even if the glass window is ascended while being in slidable contact with the surface electrode b or b' since the door 8 is bent, no detection signal is generated because of the AND circuit comprised of the switches a–b and a'–b'. Therefore, an operation failure such as stopping or reverse rotation of the motor does not occur until the window glass 2 is completely closed.

The strip-shaped pressure sensing switches each comprised of the inner and outer portions are arranged on both the sides of the contact surface of the window or door, and the inner portions are connected to constitute an AND circuit. In a structure wherein the pressure sensing switches 23a and 23b are disposed close to each other by an interval corresponding to the thickness of the window or door so as to detect clamping of a small foreign object, even if one of the pressure sensing switches as the inner portions is turned on due to vibrations of the window or door, no detection signal is generated. In addition, the pressure sensor switches as to the outer portions thereof constitute an OR circuit, so that clamping of a relatively large foreign object can be accurately detected by one or both of the pressure sensing switches.

FIGS. 10 to 14 show another arrangement of pressure sensors according to the present invention.

A pair of strip-sheet pressure sensors 33a and 33b inside and outside the automobile are respectively mounted on glass guide tapered surfaces 27a and 27b of a window frame packing 3 fitted in a recess of a window frame 1.

Figure 11:
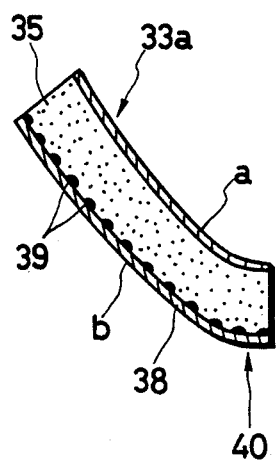
Figure 12:
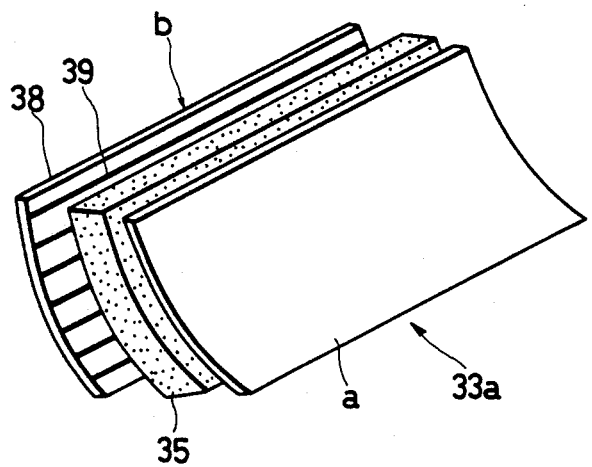

The pressure sensors 33a and 33b are symmetrical about the glass window 2. One pressure sensor 33a has a structure wherein conductive rubber 35 whose conductivity is changed by a pressure is sandwiched between a front surface electrode b and a rear surface electrode a, as shown in FIGS. 11 and 12.

The front surface electrode b comprises a plurality of parallel conductors 39 formed on the inner surface of a sheet-like resistive material 38 and extending in a longitudinal direction of the strip-sheet pressure sensor 33a. The rear surface electrode a comprises a sheet-like conductive material. The pressure sensor 33a is bent at a bent portion 40 near the lower end thereof. The electrode b of the bent portion 40 extends in a direction substantially perpendicular to the vertical direction of the window glass 2.

Figure 13:
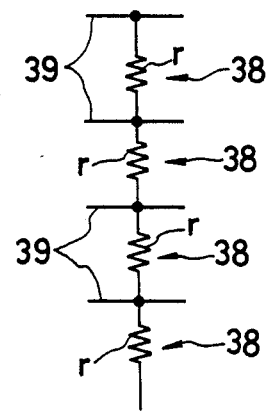

As shown in an equivalent circuit of FIG. 13, the front surface electrode b couples the conductors 39 through interline resistances r of the sheet-like resistive material.

Figure 14:
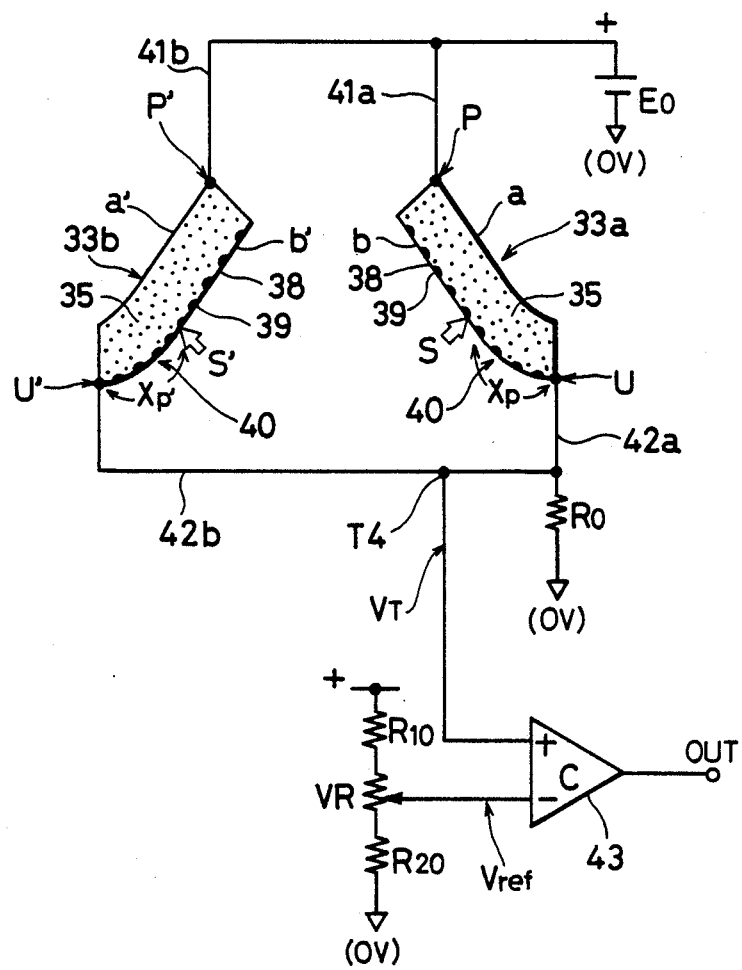

FIG. 14 shows a sensor circuit arranged by connecting electrodes of the sensors 33a and 33b. A front surface electrode of the sensor 33b and its rear surface electrode are given as b' and a', respectively. The rear surface electrodes a and a' are connected from corresponding ends P and P' to a power source $E_0$ through corresponding power lines 41a and 41b. The front surface electrodes b and b' are commonly connected to an output terminal T4 through corresponding output lines 42a and 42b connected to conductors 39 at outermost points U and U' (far ends from the window glass 1). The front surface electrodes b and b' are grounded through a resistor $R_0$. A signal appearing at the output terminal T4 is supplied to a comparator 43 and is compared with a reference voltage Vref set by a voltage divider composed of a resistor R10, a variable resistor VR, and a resistor R20.

Portions between the electrode a and b and between the electrodes a' and b' constitute switches a–b and a'–b' which are sensitive to a pressure. The switches a–b and a'–b' are short-circuited at pressure points S and S' on the electrodes b and b', indicated by arrows, respectively. Resistances of the sensors are changed in accordance with distances $x_p$ and $x_{p'}$ from the outermost points U and U' to the pressure points indicated by the arrows, respectively. In other words, resistances $R_{xp}$ and $R_{xp'}$ between the P–U and P'–U intervals are changed in accordance with changes in the distances $x_p$ and $x_{p'}$, respectively. If the pressure points S and S' are close to the points U and U', the resistances $R_{xp}$ and $R_{xp'}$ are low. Otherwise, the resistances $R_{xp}$ and $R_{xp'}$ are high. Each resistance is proportional to the number of conductors 39 from the points U and U' to the pressure points.

A voltage $V_T$ appearing at an output terminal T4 is given as follows:

$$V_T R_0 E_0/(R_{xp}//R_{xp'} + R_0) \tag{1}$$

where // represents a parallel resistance.

A value of the parallel resistance $R_{xp}//R_{xp'}$ obtained when the pressure points S and S' are located at positions inward from the bent portions 40 by a distance twice a distance of the bent portion 40 is given as $r_0$. A value of the variable resistor VR is set such that the corresponding output voltage $V_T$ is equal to the reference voltage Vref of the comparator 43. If the following inequality is established in an area outward from the above-mentioned pressure points S and S':

$$R_{xp}//R_{xp'} < r_0 \tag{2}$$

$V_T$ in equation (1) satisfies condition $V_T >$ Vref. Therefore, an output from the comparator 43 is a detection output (high level) representing clamping of a foreign object.

CONDITION (1)

In an area ranging from the points for $R_{xp} < r_0$ or $R_{xp'} < r_0$ to the outermost points U and U' outside the pressure points S and S' where $V_T =$ Vref, if only one of the sensors 33a and 33b is depressed, $R_{xp}$ or $R_{xp}$ of the other sensor has almost an infinite resistance, thus establishing inequality (2). Under this condition, when a hand or neck is clamped between the window frame 1 and the window glass 2, the comparator 43 generates a detection output of high level.

The pressure points for $R_{xp} < r_0$ or $R_{xp'} < r_0$ are located at positions outward by about $\frac{1}{2}$ of the distances $X_p$ or $X_{p'}$ for $V_T$ (equation (1))=Vref. These pressure points are set near the bent portions 40.

CONDITION (2)

In an area where $R_{xp} > r_0$ and $R_{xp'} > r_0$, i.e., an area inside the area satisfying condition (1), the window glass 2 is ascended while being in slidable contact with the electrode a or a' because of the distorted door. In this case, the sign of inequality (2) is reversed, and no detection output is generated. Therefore, an operation failure such as stop or reverse rotation of the motor does not occur until the window glass 2 is completely closed.

In an area outside the pressure points for $V_T$(equation (1))=Vref with simultaneous depression of the sensors 33a and 33b, inequality (2) is established. A clamping detection signal is generated.

As described above, when the reference voltage Vref is properly determined by the variable resistor VR, a detection signal is generated when one or both of the pressure sensors 33a and 33b are depressed in an area outside given points. When only on of the sensors 33a and 33b is depressed in an area inside the given points, no detection output is generated. Therefore, the operation failure can be prevented, while the distance between the sensors 33a and 33b can be reduced to form a gap substantially corresponding to the thickness of the window glass, thereby detecting clamping of a very small foreign object.

The same function as described above if the front and rear surface electrodes b and a are reversed from each other. Separate comparators 43 may be arranged for the pressure sensors 33a and 33b. In this case, each pressure point is discriminated as a point outside o inside a preset point in accordance with a resistance value. If a pressure is detected by one of the inner portions, no detection output is generated. However, if a pressure is detected by one or both of the outer portions and both of the inner portions, a detection output is generated. Such logical processing may be performed on the basis of outputs from the separate comparators.

As has been described above, the strip-sheet pressure sensing switches 33a and 33b are arranged on both sides of the contact surface 3a of the window or door. The resistances from the pressure points of the pressure sensing switches to the output terminals are changed in a direction away from the contact surface 3a. The threshold resistance of the outer portion is different from that of the inner portion during the switch ON states. The threshold resistance is preset in a widthwise direction of the strip-sheet. In an arrangement wherein the pressure sensing switches are arranged close to each other at an interval corresponding to about the thickness of the window or door to allow detection of clamping of a small foreign object, detection levels corresponding to the ON resistance values are discriminated. Even if only one of the inner portions as the sensor switches is turned on due to vibrations of the window or door, an erroneous detection signal is not generated. In addition, one or both of the outer portions as the pressure sensing switches accurately detect clamping of a relatively large foreign object.

What is claimed is:

1. A motor-powered apparatus comprising:
   a motor serving as a power source for a motor-powered mechanism for opening/closing a window or door;
   a constraint stop circuit comprising,
   a comparator having an input connected to said motor for comparing an electromotive force induced at a motor terminal of said motor with a reference voltage;
   a drive transistor connected to the output of said comparator and said motor terminal and controlled to be turned on/off in response to the output of said comparator, for supplying a drive current to said motor when said electromotive force is greater than said reference voltage and cutting off said drive current when said electromotive force is less than said reference voltage;
   a shut off transistor connected to the drive transistor for making the drive transistor periodically and instantaneously turn off so as to cause said comparator to periodically compare said electromotive force with said reference voltage; and
   a circuit for forming the reference voltage which determines a motor torque when said motor is going to be stalled,
   a sensor for detecting clamping of a foreign object between a fixed frame and an edge of a window or door, said sensor being arranged on the fixed frame close to and along a contact line between the fixed frame and the edge of the window or the door; and
   switching means connected to said constraint stop circuit for stopping the supply of the power to said motor or inverting a polarity of the power in response to an output from said sensor.

2. A motor-powered closing/opening apparatus comprising:
   a motor serving as a power source for a mechanism for opening/closing a slidable window or a door;
   a constraint stop circuit for detecting a constrained state of said motor and stopping supply of power to said motor;
   said constraint stop circuit comprising,
   a drive transistor, connected in series between a power source and a terminal of said motor, for supplying/cutting off a motor drive current;
   a rotation detection transistor, connected to said terminal of said motor, for detecting an induction voltage so as to be turned on while said motor is rotated,
   said drive transistor being turned on to supply the power to said motor when said rotation detection transistor is turned on, said rotation detection transistor being turned off and then said drive transistor being turned off so as to power off said motor when said motor is set in a constrained state,
   a sensor for detecting clamping of a foreign object between a fixed frame and an edge of the slidable window or the door, said sensor being arranged on the fixed frame close to and along a contact line between the fixed frame and the edge of the window or the door;
   said sensor comprising a pair o f strip-sheet pressure sensing switches mounted on said fixed frame along a contact line between said fixed frame and an edge of said window or door near the contact line so as to be located inside and outside said window or door; and switching means for stopping the supply of the power to said motor or inverting a polarity of the power in response to an output from said sensor.

3. An apparatus according to claim 1, wherein said sensor is a pressure sensor comprising pressure-sensitive conductive rubber.

4. An apparatus according to claim 1, wherein a forward/reverse rotation operation switch is connected between a terminal of said motor and a power source.

5. An apparatus according to claim 1, further comprising a sense circuit connected to said sensor, said sense circuit being provided with a control input representing movement direction of said window or door and being arranged to supply a clamping detection output from said sensor to said switching means when said window or door is driven in a closing direction.

6. An apparatus according to claim 4, further comprising a momentary switch connected in parallel with said constraint stop circuit so as to temporarily supply a power source voltage to said motor, said momentary switch being interlocked with said forward/reverse rotation operation switch.

7. An apparatus according to claim 1, wherein said window or door is an automobile window.

8. An apparatus according to claim 1, wherein said reference voltage forming circuit comprises reference voltage regulating means for setting a constraint torque of said motor.

9. An apparatus according to claim 1, wherein
said switching means comprises a transistor connected to said reference voltage forming circuit, and
said transistor is ON to cause said reference voltage forming circuit to generate the reference voltage when said sensor does not detect clamping of the foreign object and said transistor is OFF to shift up the reference voltage into the power source voltage when said sensor detects clamping of the foreign object.

10. A motor-powered closing/opening apparatus comprising:
a motor serving as a power source for a mechanism for opening/closing a slidable window or a door;
a constraint stop circuit for detecting a constrained state of said motor and stopping supply of power to said motor;
said constraint stop circuit comprising,
a comparator for comparing an electromotive force induced at a motor terminal with a reference voltage;
a drive transistor, turned on in response to an output from said comparator, for applying a drive voltage to said motor;
a shut off transistor for causing said drive transistor to periodically and instantaneously turn off,
a circuit for forming the reference voltage,
a sensor for detecting clamping of a foreign object between a fixed frame and an edge of the slidable window or the door, said sensor being arranged on the fixed frame close to and along a contact line between the fixed frame and the edge of the window or the door;
said sensor comprises a pair of strip-sheet pressure sensing switches mounted on said fixed frame along a contact line between said fixed frame and an edge of said window or door near the contact line so as to be located inside and outside said window or door, and switching means for stopping supply of the power to said motor or inverting a polarity of the power in response to an output from said sensor.

11. An apparatus according to claim 2, wherein said pair of pressure sensing switches are mounted on guide tapered surfaces of a packing fitted in a recess of said fixing frame for receiving said edge of said window or door.

12. An apparatus according to claim 1;
wherein said sensor comprises a pair of strip-sheet pressure sensing switches mounted on said fixed frame along a contact line between said fixed frame and an edge of said window or door near the contact line so as to be located inside and outside said window or door; and
wherein said pair of pressure sensing switches are mounted on guide tapered surfaces of a packing fitted in a recess of said fixing frame for receiving said edge of said window or door; and
wherein said pair of pressure sensing switches are further divided into inner portions adjacent to the contact line and outer portions, said inner portions of said pair of pressure sensing switches constituting an AND circuit, and said outer portions constituting an OR circuit.

13. An apparatus according to claim 12, wherein each of said pair of pressure sensing switches comprises a strip-sheet pressure sensing member, a resistance of which is decreased in response to a pressure, and electrodes formed on front and rear surfaces of said pressure sensing member,
said upper surface electrode being divided into an inner electrode closer to said window or door and an outer electrode away from said window or door and spaced apart from said inner electrode by a gap, said common rear surface electrode and said inner and outer front surface electrodes constituting said inner and outer portions of said pressure sensing switch.

14. An apparatus according to claim 12, wherein each of said pair of pressure sensing switches is bent at a position corresponding to said gap, and said outer portion of said pressure sensing switch faces a movable direction of said window or door.

15. An apparatus according to claim 14, wherein said inner electrodes of said pair of pressure sensing switches are coupled to each other, said common rear surface electrode of one pressure sensing switch is coupled to said outer electrode of the other pressure sensing switch to constitute a connecting point which is connected to an output terminal, and said outer electrode of said one pressure sensing switch is coupled to said common rear surface electrode of said other pressure sensing switch to constitute a connecting point which is connected to the power source.

16. An apparatus according to claim 10, wherein each of said pair of pressure sensing switches comprises a strip sheet pressure sensing member whose resistance is decreased in response to a pressure and electrodes formed on upper and lower surfaces of said pressure sensing member, one of said electrodes comprising sheet-like resistive member with a plurality of parallel conductors formed on said resistive member on a pressure sensing member side and extending along a longitudinal direction of said strip-sheet pressure sensing member, so that a resistance substantially proportional to the number of conductors from pressure points to signal output terminal of said pressure sensing switches is generated when said pressure sensing switches are turned on upon application of a pressure.

17. An apparatus according to claim 16, further comprising a detector for converting resistance values to detection voltages during ON operations of said pair of pressure sensing switches, and a comparator for comparing the detection voltages with the reference voltage, wherein positions of the pressure points of said pressure sensing switches are discriminated to belong to an inner or outer area in accordance with an output from said comparator.

18. An apparatus according to claim 17, wherein outermost points of a sheet-like resistive member constituting said one electrode are connected to each other and are led to a detection output terminal connected to an input of said comparator, and said other electrode are commonly connected to the power source, thereby connecting the pair of pressure sensing switches in parallel with each other, and the reference voltage of said comparator is set such that a detection output representing no pressure is generated when one of said pressure sensing switches is turned on in a pair of said inner regions, a resistance of said other pressure sensing switch in off state is very high so that a parallel resistance of said pair of 19. An apparatus according to claim 18, wherein said pressure sensing switch is bent from an intermediate portion thereof such that a surface of said outer area faces the movable direction of said window or door.

20. A motor-powered apparatus comprising a motor having motor terminals serving as a power source for a motor-powered mechanism;
a constraint stop circuit comprising,
a comparator having an input connected to said motor for comparing an electromotive force induced at a motor terminal of said motor with a reference voltage;
a drive transistor connected to the output of said comparator and said motor terminal and controlled to be turned on/off in response to the output of said comparator, for supplying a drive current to said motor when said electromotive force is greater than said reference voltage and cutting off said drive current when said electromotive force is less than said reference voltage;
a shut off transistor connected to said drive transistor for making the drive transistor periodically and instantaneously turn off so as to cause said comparator to periodically compare said electromotive force with said reference voltage; and
a circuit for forming the reference voltage which determines a motor torque when said motor is going to be stalled.

* * * * *